United States Patent Office 3,110,293
Patented Nov. 12, 1963

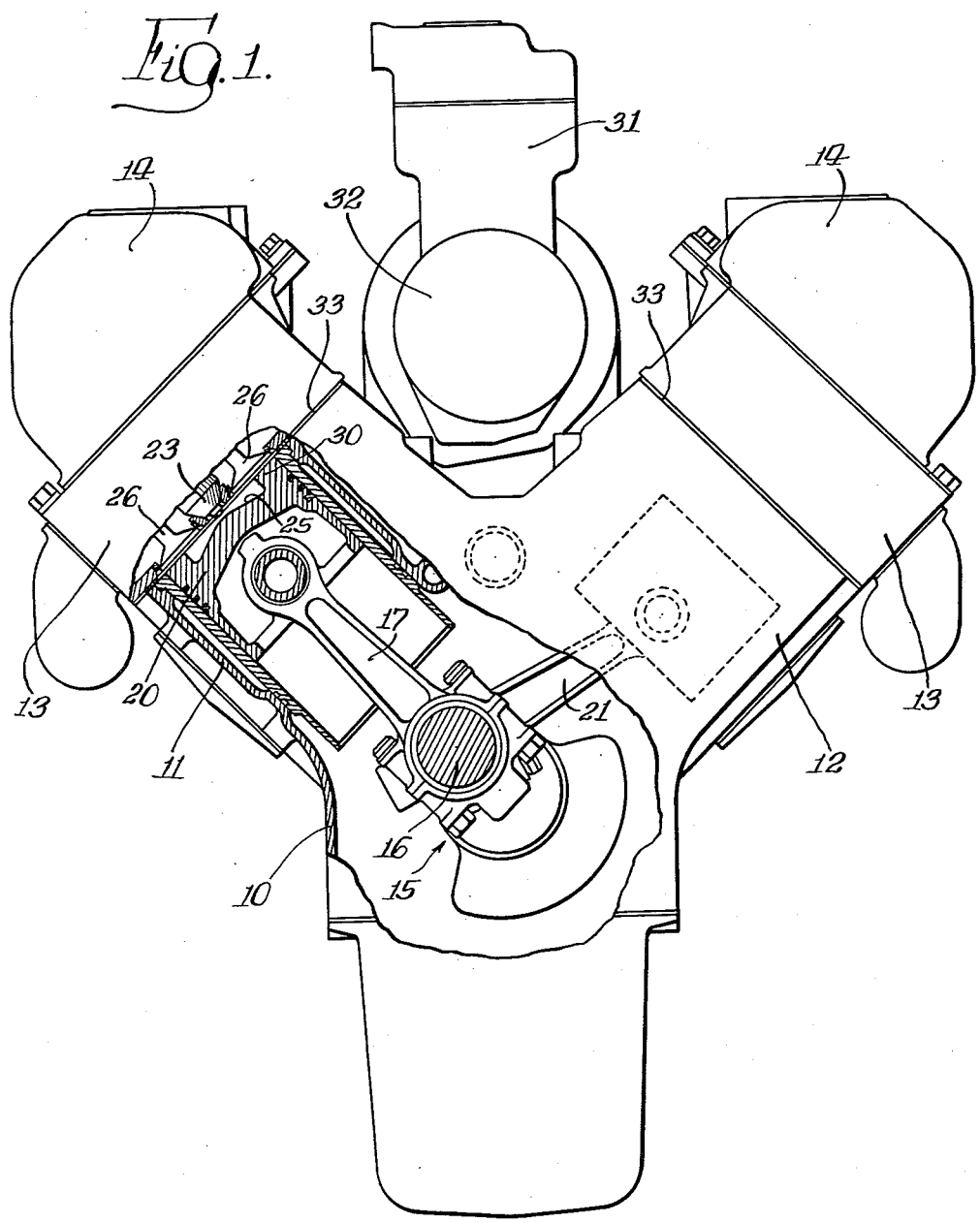

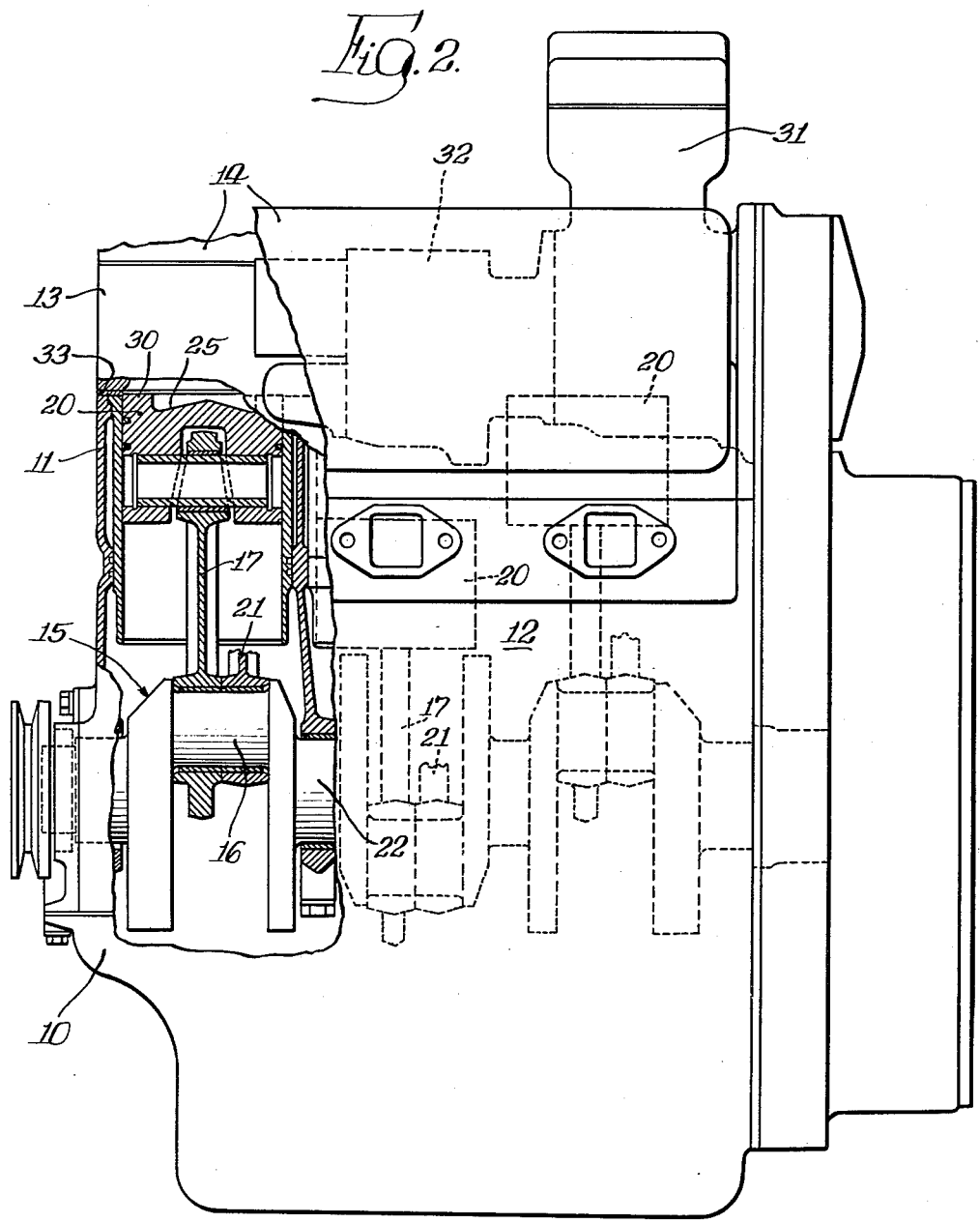

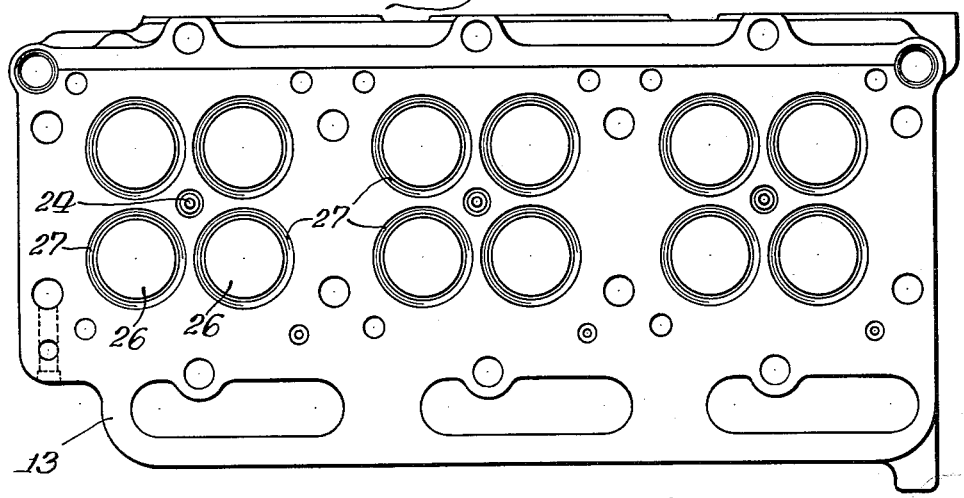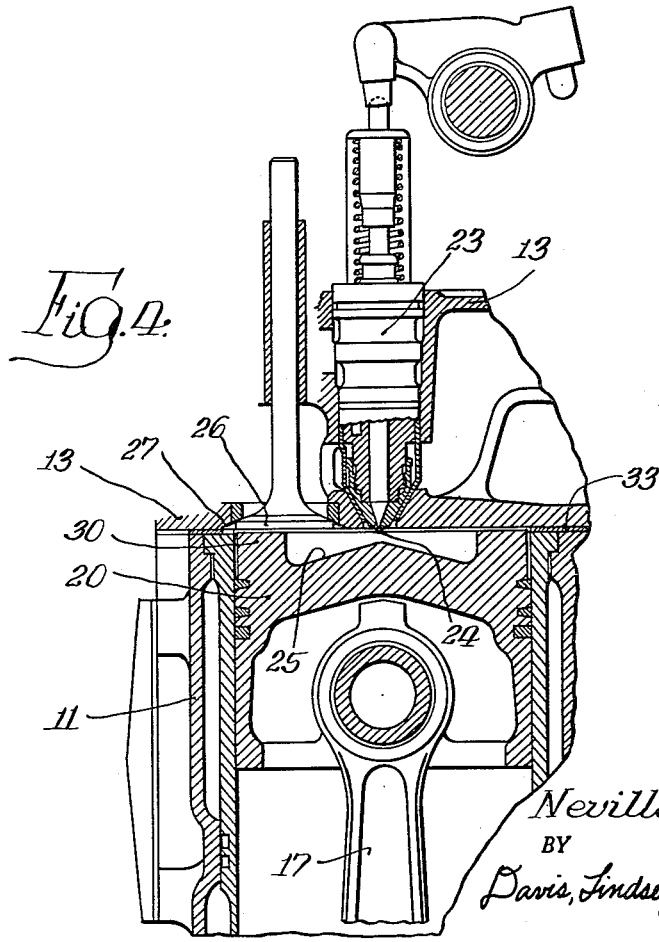

3,110,293
INTERNAL COMBUSTION ENGINE
Neville M. Reiners, Columbus, Ind., assignor to Cummins Engine Company, Inc., Columbus, Ind., a corporation of Indiana
Filed May 24, 1961, Ser. No. 112,401
7 Claims. (Cl. 123—32)

The invention relates generally to internal combustion engines and more particularly to an internal combustion engine of the compression-ignition type.

The general object of the invention is to provide a novel compression-ignition engine having a more compact structure for a specific power output, than conventional engines as heretofore constructed.

Another major object is to provide a novel compression-ignition engine having increased specific power output over that of conventional compression-ignition engines as heretofore constructed.

A further object is to provide a novel compression-ignition engine having increased engine efficiency and durability over such conventional compression-ignition engines.

It is also an object to provide a novel compression-ignition engine which has less length and less height for a given horsepower rating than conventional compression-ignition engines as heretofore constructed.

Still another object is to provide a novel compression-ignition engine for automotive vehicle use, which permits the use of lighter frame construction for supporting the engine in the vehicle and a lighter transmission, than has heretofore been used.

Other objects and advantages will become apparent from the following description taken in connection with the acompanying drawings, in which:

FIG. 1 is an end elevational view, partially in section, of an engine embodying the features of the invention;

FIG. 2 is a side elevational view of the engine shown in FIG. 1, with the front cylinder of the left-hand bank, as shown in FIG. 1, in section;

FIG. 3 is a view of the underside of a cylinder head of the engine; and

FIG. 4 is a fragmentary sectional view of one of the cylinders of the engine.

Compression-ignition engines, as heretofore conventionally constructed, have had a stroke-to-bore ratio over 0.9, usually about 1.2. It has been the opinion of many compression-ignition engine designers that best efficiencies were to be obtained with a stroke-to-bore ratio of such value.

Gasoline engines, that is, spark ignition engines, have been commercially built with low stroke-to-bore ratios in order to obtain the above advantage. Commercial activity in the field using low stroke-to-bore ratios compression-ignition engines has heretofore been unsatisfactory because of the basic problem of obtaining good combustion efficiency in the short stroke diesel. This has not been a problem in the spark ignition engine development. The principal problem in the open chamber compression-ignition engine originates from the reduced volume of the combustion chamber cavity into which the fuel must be injected so as to mix completely and rapidly with all of the air. Spark ignition engines with low stroke-to-bore ratios do not have this problem because the air and fuel are premixed outside of the cylinder as in a carburetor. While experimental attempts have been made to build a compression-ignition engine with stroke-to-bore ratio less than 0.9, such engines were not of the open chamber type but were provided with precombustion chambers, since it was deemed commercially impossible to build a compression-ignition engine with such a stroke-to-bore ratio where the fuel and air are to be mixed solely within the cylinder.

An engine embodying the features of the present invention is of the compression-ignition type but has a stroke-to-bore ratio less than 0.9, with the mixture of the fuel and air occurring entirely within each cylinder which therefore is of the open chamber type. Such engine, in its preferred form, has increased efficiency over that of conventional engines but its major advantage is its increased specific power output. The preferred form is of the V-type, and with such form, a much more compact structure is obtained than has been possible with conventional engines.

In designing an engine of this character, certain problems are encountered, which require careful consideration and result in changes from conventional practice. Thus, if the lower stroke-to-bore ratio is obtained by decreasing the stroke, the clearance volume in each cylinder at the top dead center must be reduced in order to maintain a sufficient compression ratio to effect combustion. Such reduced clearance volume involves careful designing of the crown of the piston and the adjacent area of the cylinder head in order to effect proper mixing of the fuel and air.

In a compression-ignition engine of the open chamber type, that is, where the mixing of the fuel and air occurs entirely within the cylinder, the cylinder diameter must exceed a certain practical minimum limit in order to obtain sufficient mixing of the air with the fuel after the later leaves the nozzle of the injector. With the nozzle of the injector located approximately on the axis of the cylinder, the minimum practical limit for the cylinder is about four inches. Such location of the injector is advantageous in that the fuel is dispersed in all radial directions from the nozzle and effective mixing of the fuel and air is thereby attained. Preferably, in the open combustion chamber structure shown, the jets of fuel leaving the nozzle may be directed into the clearance volume without any substantial impingement on adjacent surfaces, since substantial accumulation of fuel on such surfaces may not readily mix with the air and not burn properly. With the reduced clearance volume, the space between the crown of the piston and the cylinder head into which the jets of fuel are directed must be kept free of projecting parts and for this reason the valves carried by the cylinder head are recessed into the head to leave the above-mentioned space clear. The recessing of the valves also provides part of the clearance volume.

The clearance volume is provided in part by an annular cavity formed in the crown of the piston, the cavity being defined at its outer cirmumference by an upwardly extending annular flange at the periphery of the piston. Because of the reduced clearance volume, such flange closely approaches the cylinder head as the piston moves to top dead center, and air is thereby forced radially inward to enhance the mixing of the fuel and air.

Another advantage obtained with a compression-ignition engine having a low stroke-to-bore ratio is a reduction in pumping losses. Thus, proportionately larger valves for a given cylinder displacement can be accommodated. Port velocities are thereby reduced, with a consequent reduction in pumping losses and an improvement in combustion efficiency and peak output through improved air-fuel ratios.

With the low stroke-to-bore ratio, the r.p.m. of the engine can be substantially increased with average piston speeds kept within practical limits. The increased r.p.m., for a given horsepower rating, results in less torque on the transmission of a vehicle driven by such an engine. The transmission therefore may safely be of lighter construction.

As heretofore mentioned, the preferred form of engine is the V-type and the drawings illustrate an engine of this type, embodying the features of the invention. However, many of the advantages may be attained in any form of engine. The preferred embodiment shown in the drawings comprises a cylinder block 10 having two banks 11 and 12 of cylinders. The present embodiment is a V-6 engine, and each of the banks 11 and 12 thus has three aligned cylinders, the banks being placed at 90° to each other. Each bank is provided with its own cylinder head 13, and a cover 14 may be placed over the cylinder head to enclose the valve actuating and injector actuating mechanism.

The crankshaft of the engine, indicated generally at 15, of course has the usual front and rear main bearings and, in this instance, three crank pin bearings, one of which is shown at 16. Each crank pin bearing 16 receives the connecting rod 17 for the piston 20 in a cylinder of the bank 11 as well as the connecting rod 21 for the piston in the corresponding cylinder of the bank 12. To provide adequate support for the crank pin bearings 16, the crankshaft has intermediate main bearings, one of which is shown at 22, between each pair of crank pin bearings. The crank pin bearings are thus spaced far enough apart longitudinally of the crankshaft to provide for cylinders in each bank of the diameter desired, keeping in mind that the cylinder diameter is larger in relation to the stroke than in engines of prior construction.

Each cylinder is provided with an injector 23 which may be located anywhere within the area of the cylinder and which is here shown as being located approximately on the axis of the cylinder and has a nozzle 24 (see FIG. 4) adapted to spray fuel in jets extending generally radially in the cylinder. The clearance volume between the cylinder head 13 and the piston 20 when the latter is at top dead center is of course much less than in a conventional engine, since a compression ratio sufficient to effect ignition must be maintained, with the reduced stroke. Thus, the piston 20 closely approaches the cylinder head 13 at the top dead center position of the piston. The piston, however, is shaped so that the jets of fuel from the nozzle 24 can rapidly and completely mix with the air for complete combustion. To this end, the crown of the piston 20 is provided with an annular cavity 25 formed by sloping the upper surface of the piston downwardly and outwardly from its axis. The jets of fuel from the nozzle 24 also slope downwardly and outwardly into the cavity 25, thus avoiding any substantial impingement on the top surface of the piston and the adjacent surface of the cylinder head and mixing with the air in the cavity 25. To prevent the valves from protruding into the path of the jets, each valve, indicated at 26, is recessed as at 27 in the cylinder head 13. The recessing 27 also forms part of the clearance volume.

To increase the mixing of the fuel and air, the piston is so shaped as to force air radially inward toward the cavity 25 as the piston approaches its top dead center position. Thus, the cavity 25 at its outer circumference is defined by an upwardly extending flange 30 at the periphery of the piston. The flange 30 closely approaches the cylinder head as the piston reaches the upper end of its stroke, forcing air inwardly to enhance the mixing of the fuel and air in the cavity 25.

As is apparent from the foregoing description, the reduced stroke-to-bore ratio is attained by reducing the stroke of the engine from that utilized in conventional engines, the bore of the cylinders being kept above the minimum practical limit for open chamber compression-ignition engines. Such bore thus provides sufficient area for the valves 26 which are proportionately larger for a given cylinder displacement than in conventional engines. In the present instance, as shown in FIG. 3, four valves, two for intake and two for exhaust, may be arranged around the injector 23 at the axis of each cylinder, although only one intake valve and one exhaust valve could be used. Port velocities of the air entering the cylinder and of the exhaust gas leaving the cylinder are thus reduced with a consequent reduction in pumping losses.

In an engine embodying the invention, the length of the connecting rods, such as the rods 17 and 21, may be reduced. In any engine, the connecting rods are of course made as short as possible without creating an excessive side thrust of the pistons against the cylinder walls. With reduced length of the connecting rods, the cylinder block and hence the overall size of the engine may be reduced. Consequently, the ratio of the length of the piston rods to the bore of the cylinders is reduced, and such ratio in an engine embodying the invention is less than 1.75.

The reduction of the length of the connecting rods also provides a reduction in the distance from the crankshaft axis to the outer surface of the cylinder block, that is, the surface of the block at the outer or upper end of each cylinder. Such surface is indicated at 33 on each bank of cylinders in the engine shown in the drawings. The reduction in such distance of course provides a more compact engine. With the reduction in such distance, the ratio of such distance to the bore of the cylinders is reduced, and in the engine of the invention this ratio is less than 2.8.

With the banks of cylinders arranged in a V at a 90° angle to each other, the space within the V is available for accessory devices. Thus, as shown in FIGS. 1 and 2, an air compressor 31 and a fuel pump 32 may be mounted within the V.

The engine herein disclosed is extremely compact for a given horsepower rating. Thus, its length is far less than an engine of the same rating and having its cylinders in line. Its width is about the same, but its height is substantially less than that of the in-line engine. The engine is thus particularly suited for use in vehicles where a minimum length and height are highly advantageous. The engine has a high specific output and consequently for a given horsepower rating its total weight is less than for conventional engines. The lower total weight coupled with the decreased length permits the vehicle builder to use a lighter frame structure than has heretofore been employed, resulting in lower vehicle cost and less operating cost since the dead weight of the vehicle is reduced. The lighter transmission, as heretofore mentioned, also contributes to these advantages. Not only is a higher specific output attained but an improved efficiency with no sacrifice in durability and reliability is achieved.

I claim:

1. A compression-ignition engine comprising a plurality of cylinders of the open chamber type with the cylinders in at least two banks arranged in a V, a piston in each cylinder, a crankshaft, and a connecting rod connecting each piston with the crankshaft, said crankshaft having crank pin bearings equal in number to the number of cylinders in each bank with intermediate main bearings between each pair of crank pin bearings and the connecting rod for each cylinder in each bank being connected to the crank pin bearing to which the connecting rod for the corresponding cylinder in the opposite bank is connected, the ratio of the stroke of each of said pistons to the bore of said cylinders being less than 0.9 and the bore of said cylinders being not less than 4 inches, the ratio of the length of said connecting rods to the bore of said cylinders being less than 1.75, and the ratio of the distance from the crankshaft axis to the remote end of said cylinders to the bore of said cylinders being less than 2.8, each of said cylinders having a cylinder head and an injector in said head located substantially on the axis of the cylinder and valves in said cylinder head, said valves having openings extending from adjacent the injector to substantially the circumference of the cylinder, the openings of said valves for each cylinder thereby being relatively large for the cylinder displacement of the cylinder having the aforesaid stroke-to-bore ratio, each of said pistons having a spray receiving cavity in its crown with the portion of the crown exteriorly of said cavity cooperating with said cylinder head to force air inwardly as the piston approaches top dead center to intermix with the sprayed fuel, whereby said engine has a compact structure and a high specific power output.

2. A compression-ignition engine comprising a plurality of cylinders of the open chamber type, a piston in each cylinder, a crankshaft, and a connecting rod connecting each piston with the crankshaft, the ratio of the stroke of each of said pistons to the bore of said cylinders being less than 0.9 and the bore of said cylinders being not less than 4 inches, the ratio of the length of said connecting rods to the bore of said cylinders being less than 1.75, and the ratio of the distance from the crankshaft axis to the remote end of said cylinders to the bore of said cylinders being less than 2.8, each of said cylinders having an injector located substantially on the axis of the cylinder and valves at said remote end of the cylinder, said valves having openings extending from adjacent the injector to substantially the circumference of the cylinder, the openings of said valves for each cylinder thereby being relatively large for the cylinder displacement of the cylinder having the aforesaid stroke-to-bore ratio, whereby said engine has a compact structure and a high specific power output.

3. A compression-ignition engine comprising a plurality of cylinders of the open chamber type, a piston in each cylinder, a crankshaft, and a connecting rod having a wrist pin connection with each piston and connected to the crankshaft, the ratio of the stroke of each of said pistons to the bore of said cylinders being less than 0.9, the ratio of the length of said connecting rods to the bore of said cylinders being less than 1.75, the stroke of each piston and the length of each connecting rod and the height of each piston above its wrist pin and the clearance in the cylinder above the piston at top dead center being such that the ratio of the distance from the crankshaft axis to the remote end of said cylinders to the bore of said cylinders is less than 2.8.

4. A compression-ignition engine comprising a plurality of cylinders of the open chamber type, a piston in each cylinder, a crankshaft, and a connecting rod connecting each piston with the crankshaft, the ratio of the stroke of each of said pistons to the bore of said cylinders being less than 0.9 and the bore of said cylinders being not less than 4 inches, the ratio of the length of said connecting rods to the bore of said cylinders being less than 1.75, and the ratio of the distance from the crankshaft axis to the remote end of said cylinders to the bore of said cylinders being less than 2.8.

5. A compression-ignition engine comprising a plurality of cylinders of the open chamber type with the cylinders in at least two banks arranged in a V, a piston in each cylinder, a crankshaft, and a connecting rod connecting each piston with the crankshaft, said crankshaft having crank pin bearings equal in number to the number of cylinders in each bank with intermediate main bearings between each pair of crank pin bearings and the connecting rod for each cylinder in each bank being connected to the crank pin bearing to which the connecting rod for the corresponding cylinder in the opposite bank is connected, the ratio of the stroke of each of said pistons to the bore of said cylinders being less than 0.9 and the bore of said cylinders being not less than 4 inches, and the ratio of the distance from the crankshaft axis to the remote end of said cylinders to the bore of said cylinders being less than 2.8.

6. A compression-ignition engine comprising a plurality of cylinders of the open chamber type with the cylinders in at least two banks arranged in a V, a piston in each cylinder, a crankshaft, and a connecting rod connecting each piston with the crankshaft, said crankshaft having crank pin bearings equal in number to the number of cylinders in each bank with intermediate main bearings between each pair of crank pin bearings and the connecting rod for each cylinder in each bank being connected to the crank pin bearing to which the connecting rod for the corresponding cylinder in the opposite bank is connected, the ratio of the stroke of each of said pistons to the bore of said cylinders being less than 0.9, and the ratio of the distance from the crankshaft axis to the remote end of said cylinders to the bore of said cylinders being less than 2.8.

7. A compression-ignition engine comprising a plurality of cylinders of the open chamber type, a piston in each cylinder, a crankshaft, and a connecting rod connecting each piston with the crankshaft, the ratio of the stroke of each of said pistons to the bore of said cylinders being less than 0.9 and the bore of said cylinders being not less than 4 inches, each of said cylinders having a cylinder head and an injector in said head located substantially on the axis of the cylinder and valves in each cylinder head, said valves having openings extending from adjacent the injector to substantially the circumference of the cylinder, the openings of said valves for each cylinder thereby being relatively large for the cylinder displacement of the cylinder having the aforesaid stroke-to-bore ratio whereby pumping losses are reduced.

References Cited in the file of this patent

UNITED STATES PATENTS

| | | |
|---|---|---|
| 2,001,358 | Guernsey | May 14, 1935 |
| 2,556,773 | Nichols | June 12, 1951 |
| 2,654,355 | Scheiterlein | Oct. 6, 1953 |
| 2,851,019 | Fleming et al. | Sept. 9, 1958 |
| 2,921,567 | Medenus | Jan. 19, 1960 |
| 2,966,146 | Schweitzer et al. | Dec. 27, 1960 |